United States Patent [19]

Uemura et al.

[11] Patent Number: 5,636,043
[45] Date of Patent: Jun. 3, 1997

[54] LIQUID CRYSTAL DISPLAY DEVICE HAVING PARTITIONED UNIT LIQUID CRYSTAL CELLS

[75] Inventors: Tsuyoshi Uemura; Shinnya Kosako, both of Kadoma; Hideaki Mochizuki, Osaka; Masao Yamamoto, Kishiwada, all of Japan

[73] Assignee: Matsushita Electric Industrial Co., Ltd., Osaka, Japan

[21] Appl. No.: 294,583

[22] Filed: Aug. 23, 1994

[30] Foreign Application Priority Data

Aug. 25, 1993 [JP] Japan .................. 5-210174

[51] Int. Cl.$^6$ .................................. G02F 1/1339
[52] U.S. Cl. ............................. 359/81; 359/51
[58] Field of Search ................. 359/81, 51, 78, 359/74, 75

[56] References Cited

U.S. PATENT DOCUMENTS

| | | | |
|---|---|---|---|
| 4,295,712 | 10/1981 | Ishiwatari | 350/344 |
| 5,264,950 | 11/1993 | West et al. | 359/51 |
| 5,473,450 | 12/1995 | Yamada et al. | 359/51 |

FOREIGN PATENT DOCUMENTS

| | | |
|---|---|---|
| 0475117A3 | 3/1992 | European Pat. Off. . |
| 0497619A3 | 8/1992 | European Pat. Off. . |
| 0626607A2 | 11/1994 | European Pat. Off. . |
| 667162 | 3/1994 | Japan .................. 359/75 |
| 667185 | 3/1994 | Japan .................. 359/75 |
| 6160824 | 6/1994 | Japan .................. 359/73 |

OTHER PUBLICATIONS

Y. Toko et al., Sid International Symposium Digest of Technical Papers Seattle, USA, vol. 24, 16 May 1993, "TN–LCDs Fabricated by Non–Rubbing Showing Wide and Homogeneous . . . ", pp. 622–625.

European Patent Office Search Report, Aug. 11, 1995.

K. Takatori et al; "A Complementary TN LCD with Wide–Viewing–Angle Grayscale", Japan Display '92 pp. 591–594.

Y. Toko et al; "TN–LCDs Fabricated by Non–Rubbing Showing Wide and Homogeneous Viewing Angular Characteristics and Excellent Voltage Holding Ratio", SID 93 Digest pp. 662–625.

Primary Examiner—William L. Sikes
Assistant Examiner—James A. Dudek
Attorney, Agent, or Firm—Fish & Richardson P.C.

[57] ABSTRACT

A liquid display panel having minute unit liquid crystal cells, liquid crystalline molecules present in a plane passing the thicknesswise middle points of the unit liquid crystal layer and parallel to the substrate oriented substantially uniformly in all directions and at least one polarization plate, the aforementioned liquid crystal is a nematic liquid crystal material having a positive permittivity anisotropy, so that a wide viewing angle liquid crystal display panel enables high contrast and uniform display of a liquid crystal panel without a rubbing treatment.

12 Claims, 11 Drawing Sheets

△ = equi-contrast curve of contrast not less than 100
× = equi-contrast curve of contrast not less than 50
○ = equi-contrast curve of contrast not less than 20
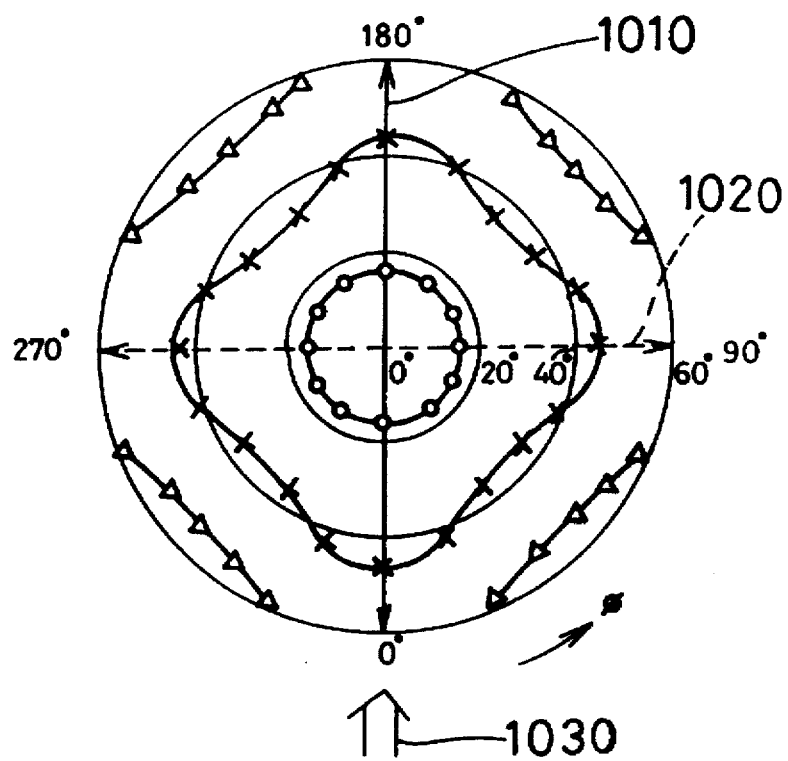
F I G. 10

△ = equi-contrast curve of contrast not less than 100
× = equi-contrast curve of contrast not less than 50
○ = equi-contrast curve of contrast not less than 20

LIQUID CRYSTAL DISPLAY DEVICE HAVING PARTITIONED UNIT LIQUID CRYSTAL CELLS

FIELD OF THE INVENTION

The present invention relates to a liquid display panel and more particularly to a wide viewing angle liquid crystal display panel with no necessity of rubbing treatment.

BACKGROUND OF THE INVENTION

Recently, efforts has been made to develop the so-called active matrix type liquid crystal display panel which has a thin film transistor as a switching element for each picture element for obtaining a high quality picture. Compared with the simple matrix type, this type of liquid crystal display panel has high contrast ratio regardless of an increasing number of scanning lines and hence is being rapidly adopted for such fields as pictures for an engineering work station (EWS) which require high capacity and other fields where high picture brightness is required.

Widely used for liquid crystal display panels of the active matrix type is the TN (twisted nematic) system. This system has between two opposing substrates a liquid crystal panel of construction in which liquid crystalline molecules are twisted vertically 90° by two polarizing plates. The TN system has two types. One type is the NW (normally white) mode in which the aforementioned two polarizing axes are perpendicular to each other, and the direction of the major axis of the liquid crystalline molecules in the interface of either substrate is parallel or perpendicular to the polarizing axis of the polarizing plate on the same side. The second type is the NB (normally black) mode in which the aforementioned polarizing axes are parallel to each other, and the direction of the liquid crystalline molecules is parallel or perpendicular to the polarizing axes of the polarizing plates on the same side.

With such a liquid crystal display panel a so-called rubbing treatment was neccessary. A rubbing treatment is a treatment in which a polymer thin film of e.g. polyimide is formed on a liquid crystal display panel's substrate and rubbed in a given direction with nylon, polyester cloth or the like, for equalizing the orientation direction of liquid crystalline molecules. As a result, it is possible to obtain a mono-domain all over the panel.

Since, however, this rubbing treatment possibly causes electrostatic destruction, dusting, staining of the film or the like, a process which does not include a rubbing treatment has been developed, for example, a process of orienting nematic liquid crystals by forming micro-groups over a substrate by application of the photolithograph (Kawada et al.: preliminaries for the 17th Forum on Liquid Crystals, 2F108).

With the widening scope of uses for liquid crystal display panels and also with efforts for up-sizing screens in full colors, however, the problem of the narrowness of visual angle, even in liquid display panels of the active matrix type with its high display quality has been studied.

In a liquid crystal display panel, liquid crystalline molecules try to orient in the direction of the electric field with release of their twisted construction when voltage is applied between the substrates, but the polarization (condition) of the light transmitting through the panel varies due to spatial orientation of the then liquid crystalline molecules, and the transmitted light is dimmed. In NW mode, for example, white display is obtained when no voltage is applied, and black display is obtained when a sufficiently high voltage is applied. Even if the liquid crystalline molecules are under the same spatial conditions when the voltage applied is constant, light's polarization conditions vary according to the incident direction of light into the liquid crystal layer. Hence, light transmission intensity is bound to vary when compared with that where incident light is perpendicular to the panel. Further, the transmitted light intensity is determined by the orientation of the liquid crystalline molecules located in the plane amid the substrates (mid plane). In other words, light intensity is determined by the inclination angle of the major axis of the liquid crystalline molecules in the mid-plane and the position from which the light transmitted through the liquid crystal panel is observed.

With both the aforementioned rubbing method and the photolithographic method, the direction along which the liquid crystalline molecules in the mid-plane are inclined by the electric field is fixed with respect to the panel plane. This gives rise to some difference in birefringence according to the visual angle (viewing angle), that is, a variation in the polarizing stage of the transmitted light and a problem relating to viewing angle. This results in large variation in contrast or hue according to the viewing angle.

In recent years, therefore, great efforts have been made to develop techniques for increasing the viewing angle in a liquid crystal display panel of the active matrix type. For example, a method of increasing the viewing angle by dividing each picture element of TN type liquid crystal display panel into two domains different in orientation condition has been proposed by, among others, T. Takatori et al.: JAPAN DISPLAY '92, PP. 591, (1992). This method, for example, consists of dividing a picture element into two parts so that in each picture element two kinds of liquid crystalline molecules inclined by electric field located in the mid-plane are created. This increases the viewing angle by mutually compensating the difference in birefringence determined by the viewing angle. This method is called the mutual compensation type whererin viewing angle compensation is made in two domains.

Since in the above methods the orientation domain of one picture element has to be divided into two, the exposure process has to be made anew or the rubbing treatment has to be made twice. The entire process is complicated.

A still more advanced method, which does not require a rubbing treatment and which is effective for a simultaneous increase in the viewing angle was proposed (by Y. Toko et al.: SID '93 DIGEST. PP. 622, (1993)). This method consisted of injecting a liquid crystal material between substrates coated to form an oriented polyamide film without a rubbing treatment at no less than the nematicisotropic phase transition temperature and then cooling. Thus, a plurality of domains different in orientation from liquid crystal molecules by random orientation of liquid crystalline molecules is formed which is an effective method for increasing the viewing angle.

This display method for the random-oriented liquid crystal display panel without a rubbing treatment will be described below with reference to FIG. 7.

FIG. 7 is a perspective view showing the random orientation of liquid crystal molecules without an electric field in the liquid crystal display panel. The top substrate 701 and the bottom substrate 702 a have pair of polyimide oriented films formed thereon and with a given gap between the substrates. Chiral nematic liquid crystal spontaneously having approx. 90° of twist angle is inserted at a temperature above the nematic-isotropic phase transition point followed by cooling to room temperature. The directions of the liquid crystalline molecules then formed in the interface of the substrates in the individual domains are random at exactly equal probability, but in a given liquid crystal domain 706 a plurality of sub-domains are formed since there is a mutual twisting in construction of 90° between the liquid crystalline molecules in the interface of the top and bottom substrates.

Although in this panel the liquid crystalline molecules 705 in the mid-plane are initially oriented substantially horizontal but are inclined progressively with minimization of dielectrically free energy (dielectric constant anisotropy>0) under application of voltage and toward perpendicular orientation as the voltage applied gets higher. Since the liquid crystalline molecules 705 in the mid-plane are those located at the perpendicular center of the top and bottom substrates, they are located, when the angle of twist is 90°, at ½ of the angle between the liquid crystalline molecules 703 of the top substrate and the liquid crystalline molecules 704 of the bottom substrate, or 45°. Since the viewing angle (direction) is determined by the voltage-induced direction of inclination of crystalline molecules 705 in this mid-plane, the viewing angle is constant in a given liquid crystal domain. Hence this direction is microscopically uniformized if a sufficient plurality of these liquid crystal domains having random orientations should exist, wherein the transmission intensities determined by observation from various directions become roughly symmetric with no dependency on the viewing angle.

As seen from the above explanation, however, if the number of liquid crystal domains in a single picture element should not be sufficient or if the direction of orientation of each liquid crystal domain should not be perfectly random, perfect compensation cannot be obtained and residual, dependency on the viewing angle is present. In the above described method, compensation is made by the presence of a plurality of liquid crystal domains 706 in a single picture element. Therefore the method is a multi-compensation type.

In this method compensation is made by the presence of a plurality of liquid crystal domains in a single picture element, hence the method may be called of the multi-compensation type.

The aforementioned method of increasing the viewing angle by means of random orientation, however, had the following problems.

(1) A problem that a special manufacturing apparatus is required for injection of a liquid crystal material at a temperature higher than the nematic isotropic phase transition temperature to ensure against the defect of flow orientation due to liquid crystalline flow. Another problem is lowering of the display quality and reliability if the normally practiced method of injecting liquid crystal in vacuum, in which the liquid crystal material is subjected to vacuum condition at a high temperature and a risk of loss of the low-boiling substances contained in the liquid crystal material.

(2) Liquid crystal display panels for miniature video display devices and miniature information terminals may have RGB's (Red, Green, Blue) electrode pitch of less than, for example, 50 μm and in such minute picture element it is difficult to keep stable a large number of still more minute liquid crystal domains. Linear orientation flaws (discrimination lines) resulting from application of a voltage are unstable in terms of energy and tend to grow to be still larger liquid crystal domains by fusion with adjacent liquid crystal domains. This means a major orientation flaw affecting the display quality of a liquid crystal display panel.

Also, if the size of each liquid crystal domain should not be sufficiently small, there is a marked lowering of liquid crystal. For this reason, the domains have a large size, resulting a a difference of transmittivity between each domain. As a result, the problem with out diagonally adjacent liquid crystal domains (hereinafter called "optical roughness") arose.

(3) Further, the discrimination lines produced by application of an electric field were difficult to fade away during a black display by application of a high voltage, and the resulting of escape of light caused lowering of contrast.

(4) It was necessary to arrange the display so that the viewing angle characteristics of the polarizing element itself were optimum when the intersection angle of the polarizing element was 90° (so-called "Cross-Nicol-State").

SUMMARY OF THE INVENTION

An object of this invention is to solve the aforementioned problems. Another object of this invention is to increase the viewing angle without a rubbing treatment while simultaneous-stabilizing of a liquid crystal display panel minute picture elements of still more minute liquid crystal domains. A still further object of this invention is to provide a liquid crystal display panel with easier elimination of orientation-related defect during application of high voltage, having no indication of optical roughness and having an improved display quality with its arrangement of polarizing elements optimized.

Another principal object of this invention is to provide a liquid crystal display panel high in display quality and wide in viewing angle with minute domains distributed therein stably without a rubbing treatment.

Further object of the invention is to provide a high-quality liquid crystal display panel in which it is easy to eliminate orientation-related defects with no optical roughness and without a rubbing treatment.

Still another object of the invention is to provide a liquid crystal display panel with an optimized arrangement of polarizing elements with a wider viewing angle and improved display quality.

In order to accomplish these other objects and advantages, this invention provides a liquid crystal display panel comprising liquid crystal layer comprising a surface a transparent electrode and unit liquid crystal cells partitioned by a stepping or a wall, liquid crystal molecules disposed parallel to the substrate when an electric field is absent, and liquid crystal domains non-oriented in the absence of electric field and having at least one polarizing plate outside the transparent electrode.

It is preferable that the unit liquid crystal cell partitioned by a step or a wall is made of at least one composite selected from composites of polymer and liquid crystal and composites of polymer gel and liquid crystal.

It is preferable that the liquid crystal display panel comprises substantially round minute unit liquid crystalline cells surrounded by a polymer wall at least in the vicinity of the substrate, the liquid crystalline molecules in a plane parallel to the substrate past the middle of the thickness of the liquid crystal layer of the unit liquid crystal cell are uniformly oriented at random directions in the parallel plane, the liquid crystalline molecules are oriented in the substrate interface parallel to the substrate and the liquid crystal materials are nematic having a positive permittivity anisotropy. Above description "substantially round" means including a circle, an oval, combination of a hyperbola, etc. and without a square.

It is preferable that the liquid crystal display panel comprises substantially round minute unit liquid crystalline cells surrounded by a polymer wall at least in the vicinity of substrate, there is one orientation flaw in the central portion of the unit liquid crystal cell, the liquid crystalline molecules are arranged in the substrate interface parallel to the substrate and the liquid crystal are nematic having a positive permittivity anisotropy.

It is preferable that the twist angle of the liquid crystal layer is about 90°.

It is preferable that the domains are formed at random directions without an orientation treatment.

It is preferable that the mean diameter of the unit liquid crystal cells is no less than the thickness of the liquid crystal layer and no more than the picture element pitch.

It is preferable that the intersection angle of the polarizing plates is about 90°.

It is preferable that the ratio of the spontaneous pitch P of the liquid crystal material to the thickness d of the liquid crystal layer (d/P ratio) is about 0.25.

It is preferable that the unit liquid crystal cell surrounded by a step or a wall is smaller than one picture element.

It is preferable that the height of the step is smaller than the thickness of the cell.

It is preferable that the height of the step is not less than 1 μm.

It is preferable that the liquid crystal panel is composed of liquid crystal domains at random directions, at least two polarizing plates are intersected and at least one polarizing axis of the intersected polarizing plates agrees with the viewing angle direction.

The liquid crystal display panel of the invention does not require any orientation film or rubbing treatment, is manufacturable without heating to a temperature not less than the nematic isotropic phase transition point before injection of the liquid crystal material, high in contrast required for sufficient black display by controlling the growth of discrimination, free from optical roughness or inversion of gradation, high in display quality and wide in viewing angle.

It is also possible to provide a liquid crystal display panel having a still wider viewing angle by substantialy adjusting either of the polarizing axes of the intersected polarizing plates of about 90°.

BRIEF DESCRIPTION OF THE DRAWINGS

FIG. 10 shows the viewing angle characteristics of a random-oriented liquid crystal display panel of a polarizing plate at the Cross-Nicol-State whose polarizing axis of Example 3 of the invention is in agreement with the viewing angle.

DETAILED DESCRIPTION OF THE INVENTION

Figure 7:
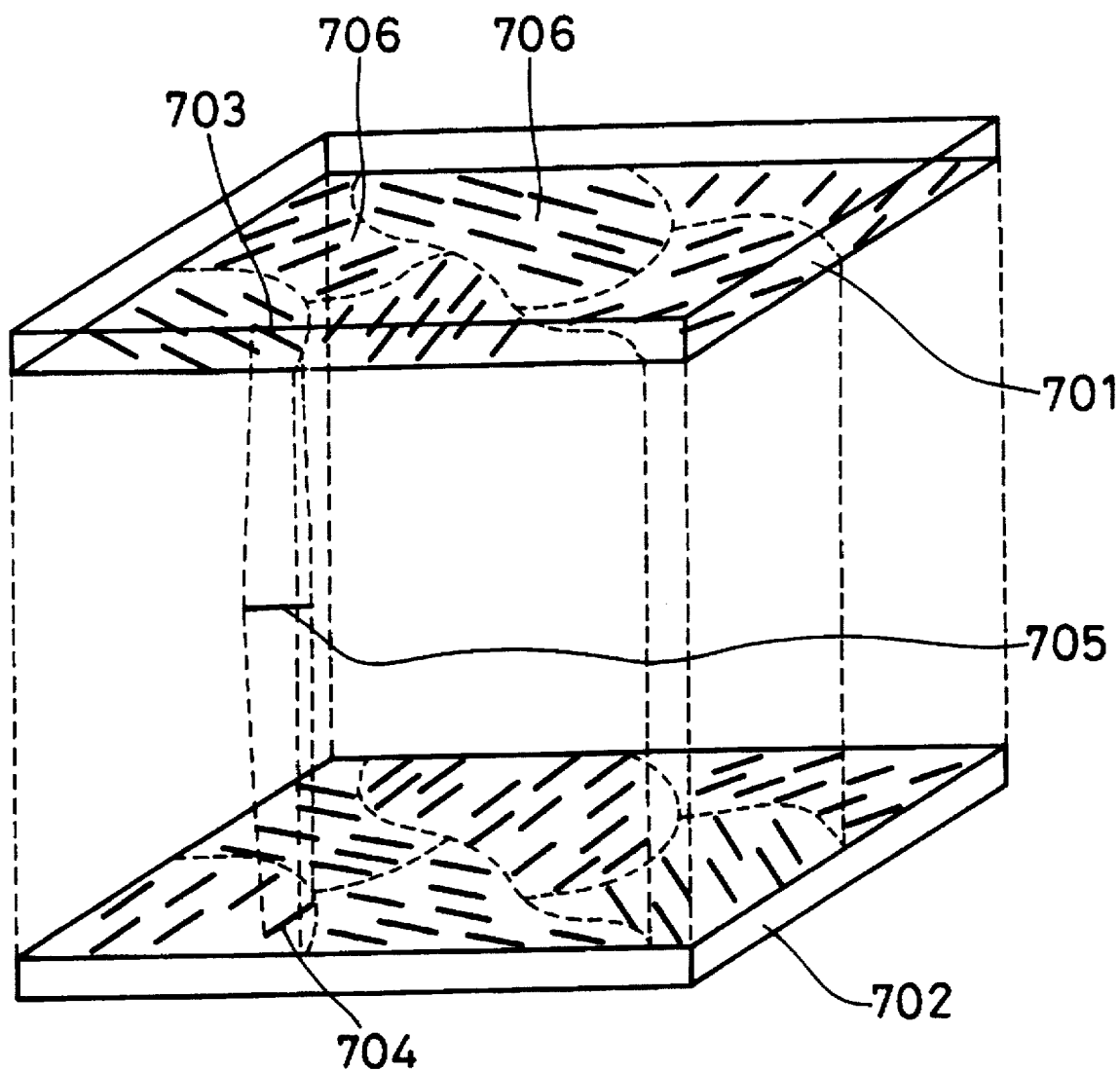
FIG. 7 is a perspective view showing orientation of liquid crystalline molecules in each domain of a conventional randomly oriented liquid crystal display panel.

As described above with regard to the prior art, a problem with a randomly oriented liquid crystal panel without an orienting treatment is the development of discrimination induced by application of a voltage as shown in FIG. 7. Another problem is that optical roughness cannot be presented unless the liquid crystal unit cell is made somewhat smaller. Hence, for lowering the optical roughness, it is necessary to prevent growth of orientation defects of the liquid crystal unit cell by means of dividing by steps or with walls.

The effect of the use of polymer walls will be described below in greater detail.

Figure 1:
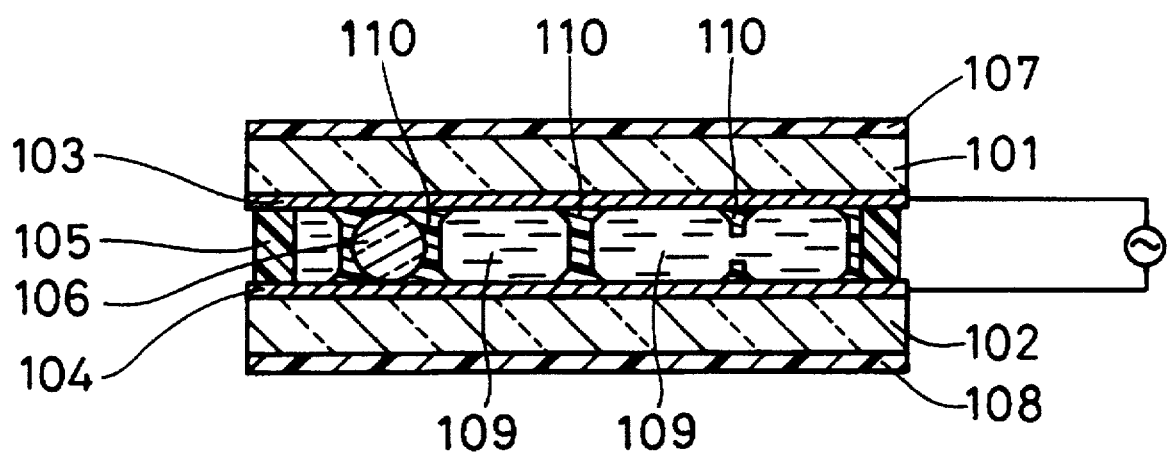
FIG. 1 is a sectional view of a liquid crystal display panel of an embodiment of the present invention.

FIG. 1 is a sectional view of a liquid crystal display panel in one embodiment of the invention. As seen from the figure, the liquid crystal panel is composed of substantially round unit liquid crystal cells as viewed from the front of the panel surrounded by polymer walls 110 at least on the surface of electrode substrates 103, 104. 109 shows unit liquid crystalline cells which domains of chiral nematic liquid crystal.

Figure 2:
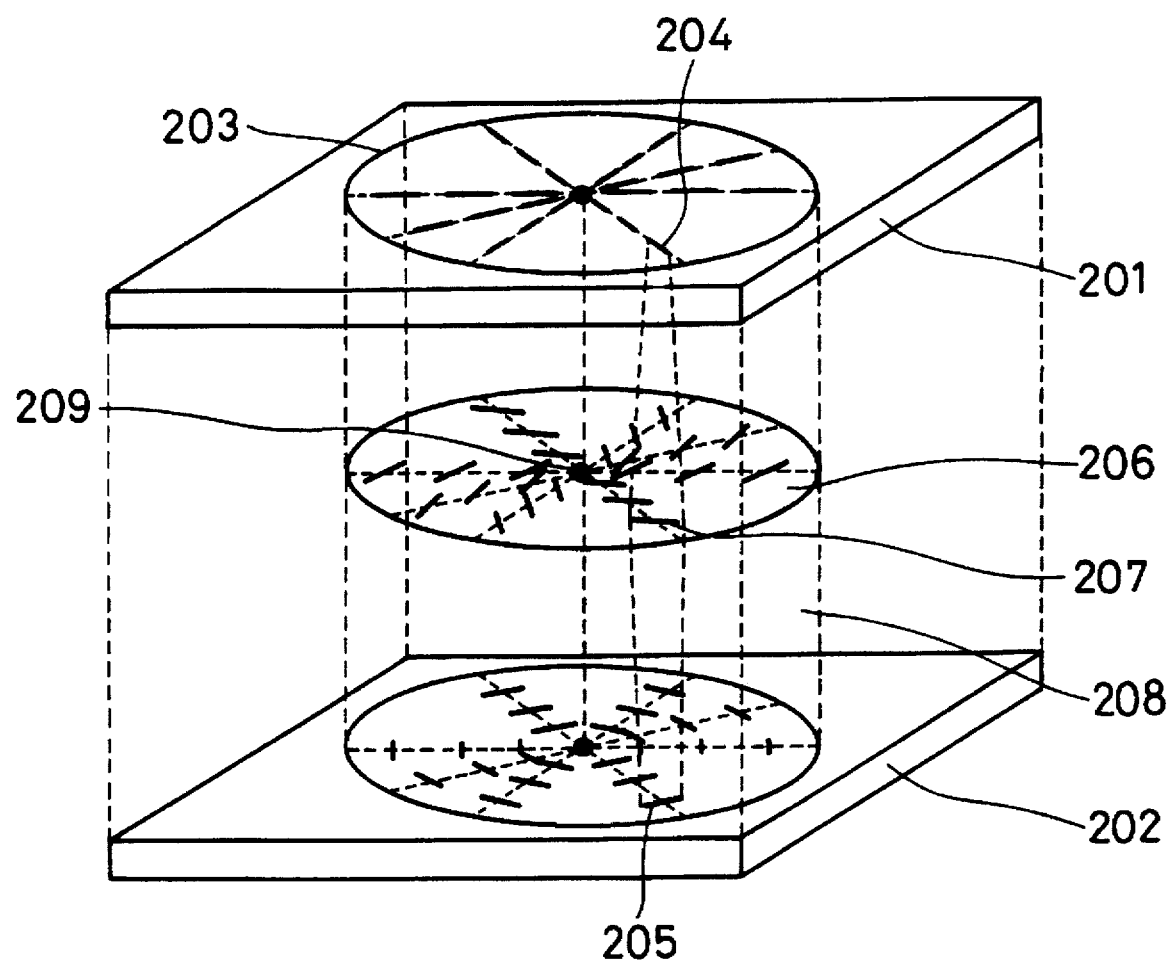
FIG. 2 is a perspective view showing orientation of liquid crystalline molecules of a unit liquid crystal cell whose construction is twisted 90° compared with that of a liquid crystal display panel of an embodiment of the invention.

FIG. 2 is a perspective view of the aforementioned unit liquid crystal cell.

Between an opposing top substrate 201 and a bottom substrate 202 a nematic liquid crystal is disposed with its orientation separate from that of the adjacent liquid crystal cell by a polymer wall 203. The aforementioned polymer wall 203 is obtainable by photo-phase separation of a nematic liquid crystal material and an UV-ray hardening resin monomer by means of ultra-violet radiation. Also, since the polymer obtained by photo-phase separation has scarcely any birefringence, the light having transmitted through the polymer wall is shielded when it is picked with two polarizing plates with an intersecting angle of 90°, there is no influence on the lowering of the contrast of the liquid crystal display panel. 208 shows unit liquid crystal cell.

In the aforementioned unit liquid crystal cell obtained under proper conditions, the liquid crystalline molecules 207 are positioned on a mid-plane 206 point symmetrically and typically radially, vortex-like or concentrically with the specific point 209 (orientation defect) as the center.

The liquid crystalline molecules 207 in the mid-plane 206 are oriented at first substantially parallel but, when a voltage is applied, the molecules are progressively inclined due to anisotropy of dielectric constant to be substantially vertical when a very high voltage is applied. Since the viewing angle is determined by the inclination angle of the major axis of the liquid crystalline molecules 207, the individual liquid crystalline molecules on the mid-plane 206 are oriented in given directions respectively. On the entire surface of the mid-plane 206, however, the liquid crystalline molecules are present symmetrically, hence the difference in transmission intensity is entirely eliminated, which results in independence from viewing angle.

The difference from the conventional viewing angle-increasing system is in the fact that while in the aforementioned domain multi-division system a plurality of domains are required, the liquid crystal display panel of this invention enables viewing angle compensation with a single unit liquid crystal cell, hence this type can be called a single compensation compared to the conventional multi-compensation type or mutual-compensation type.

FIG. 2 shows an example in which a chiral nematic liquid crystal is used which is twisted 90° roughly counterclockwise and spontaneously between the top substrate 201 and the bottom substrate 202 after addition thereto of a chiral material. The specific liquid crystalline molecules 204 of the top substrate 201 and the liquid crystalline molecule 205 of the bottom substrate 202 immediately thereunder is twisted by 90° as a result of the addition of the chiral material. Since the liquid crystalline molecules 207 on the mid-plane 206 are located vertically at the center between the top and bottom substrates, its twisted angle is 45° or just ½ of 90°.

When the liquid crystalline molecules 204 of the top substrate are oriented radially as shown in FIG. 2, the liquid crystalline molecules 207 on the mid-plane 206 are oriented spirally and the liquid crystalline molecules 205 of the bottom substrate 202 are oriented concentrically.

When the 90° twisted chiral nematic liquid crystal is used, the orientation of nematic liquid crystalline molecules of either substrate allows orientation thereof in a pattern different from that shown in FIG. 2.

Figure 3:
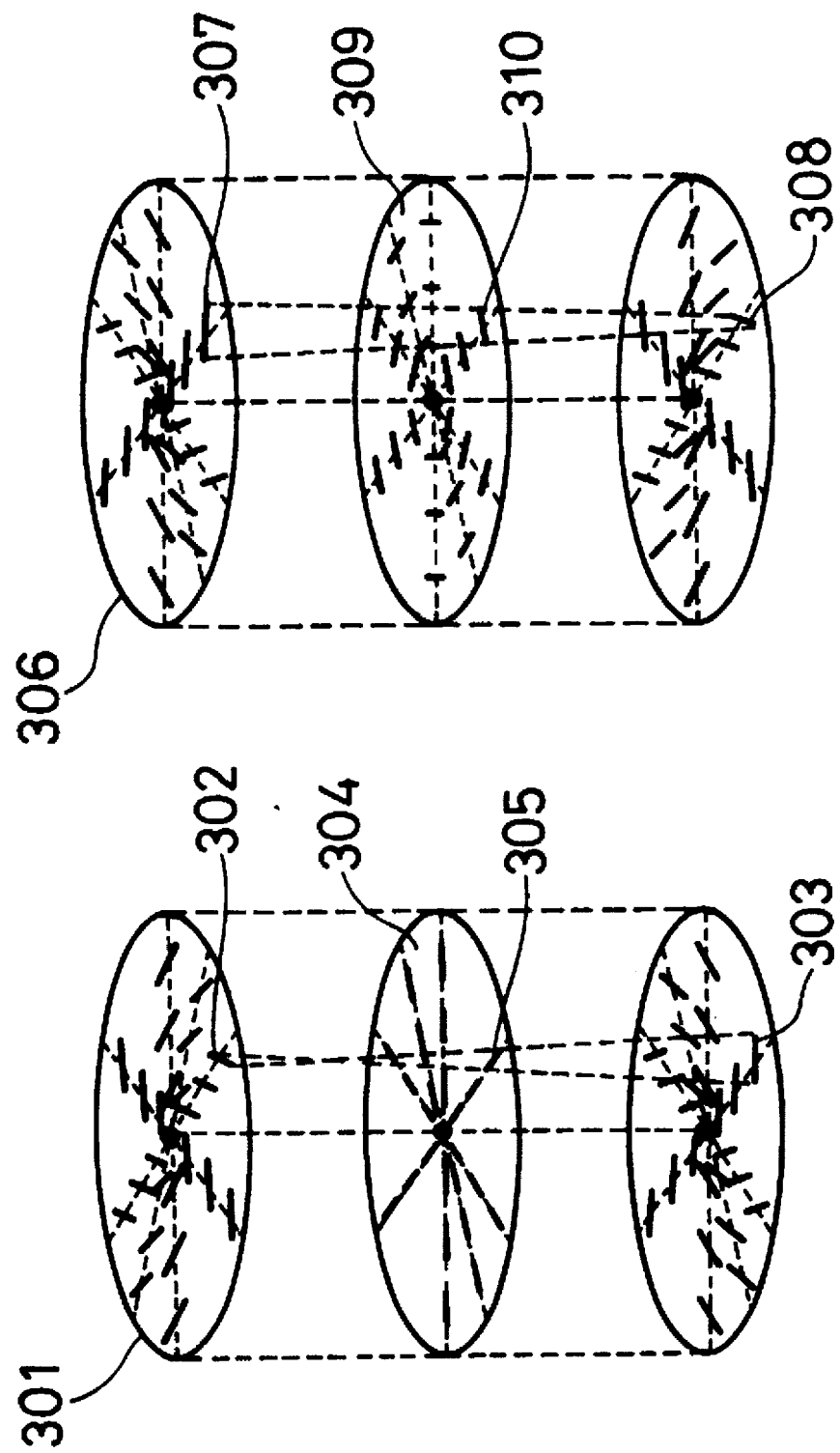
FIG. 3(a) and 3(b) are a perspective view showing orientation of liquid crystalline molecules of a unit liquid crystal cell whose construction is twisted 90° compared with that of a liquid crystal display panel of another embodiment of the invention.

FIG. 3(a) shows a case where liquid crystalline molecules 305 on a mid-plane 304 are oriented radially and FIG. 3(b) shows a case where liquid crystalline molecules 310 of a mid-plane 309 are oriented concentrically. In both cases the liquid crystalline molecules of the top substrate and those of the bottom substrate immediately thereunder are mutually twisted 45° against mid-plane molecules. 301 and 306 are polymer walls. 302, 303, 307 and 308 are liquid crystalline molecules.

Figure 4:
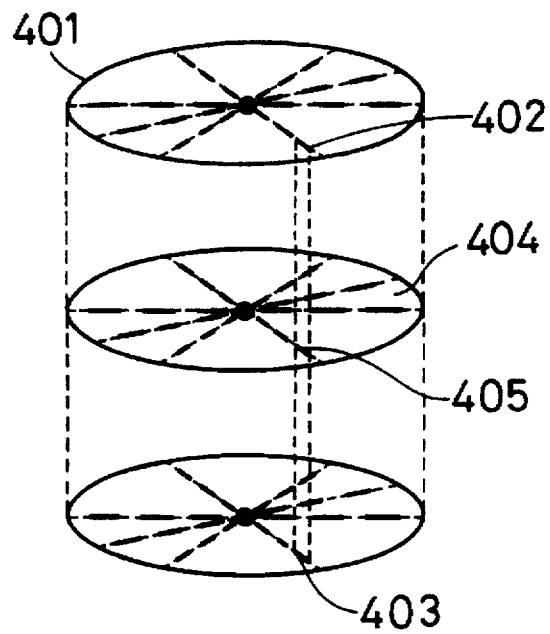
FIG. 4(a)–4(c) are a perspective view showing orientation of liquid crystalline molecules of a unit liquid crystal cell that is not twisted of a liquid crystal display panel of still another embodiment of the invention.
Figure 4:
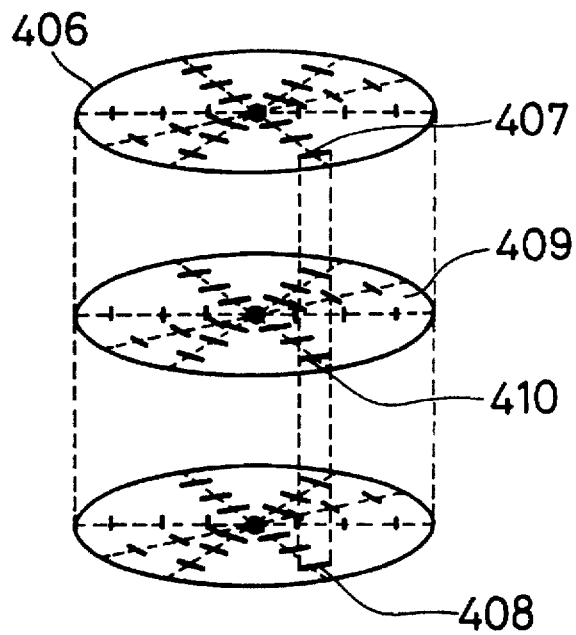
Figure 4:
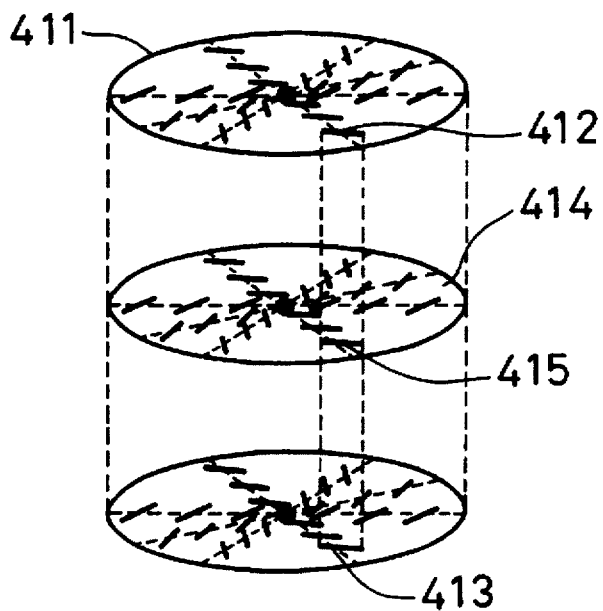

FIG. 4(a)–4(c) show the orientation of liquid crystalline molecules in the unit liquid crystal cell when nematic liquid crystal with no addition of chiral material is used as liquid crystal material. Since in this case the liquid crystal material has no twisting force, the liquid crystalline molecule of the top substrate, those on the mid-plane immediately thereunder and those of the bottom substrate have their major axes oriented in substantially the same directions.

Even when a nematic liquid crystal with no addition of chiral material is used, variations of birefringence inside a given unit liquid crystal cell depending on the incident angle of light can be uniformized as seen from FIG. 4(a)–4(c), which enables compensation of the viewing angle. When the orientation of liquid crystalline molecules is as shown in FIG. 4(a)–4(c), however, the light transmitting through liquid crystalline molecules with their major axes parallel or perpendicular to the polarization axis is shielded for there is no change of the polarized state, hence the transmission rate of the unit liquid crystal cell as a whole comes to be lower than in the case where the twisting is 90°. 401, 406 and 411 are polymer walls. 402, 403, 407, 408, 411 and 413 are liquid crystalline molecules. 404, 406 and 414 are mid-planes. 405, 410, and 415 are liquid crystalline molecules on the mid-planes.

Figure 5:
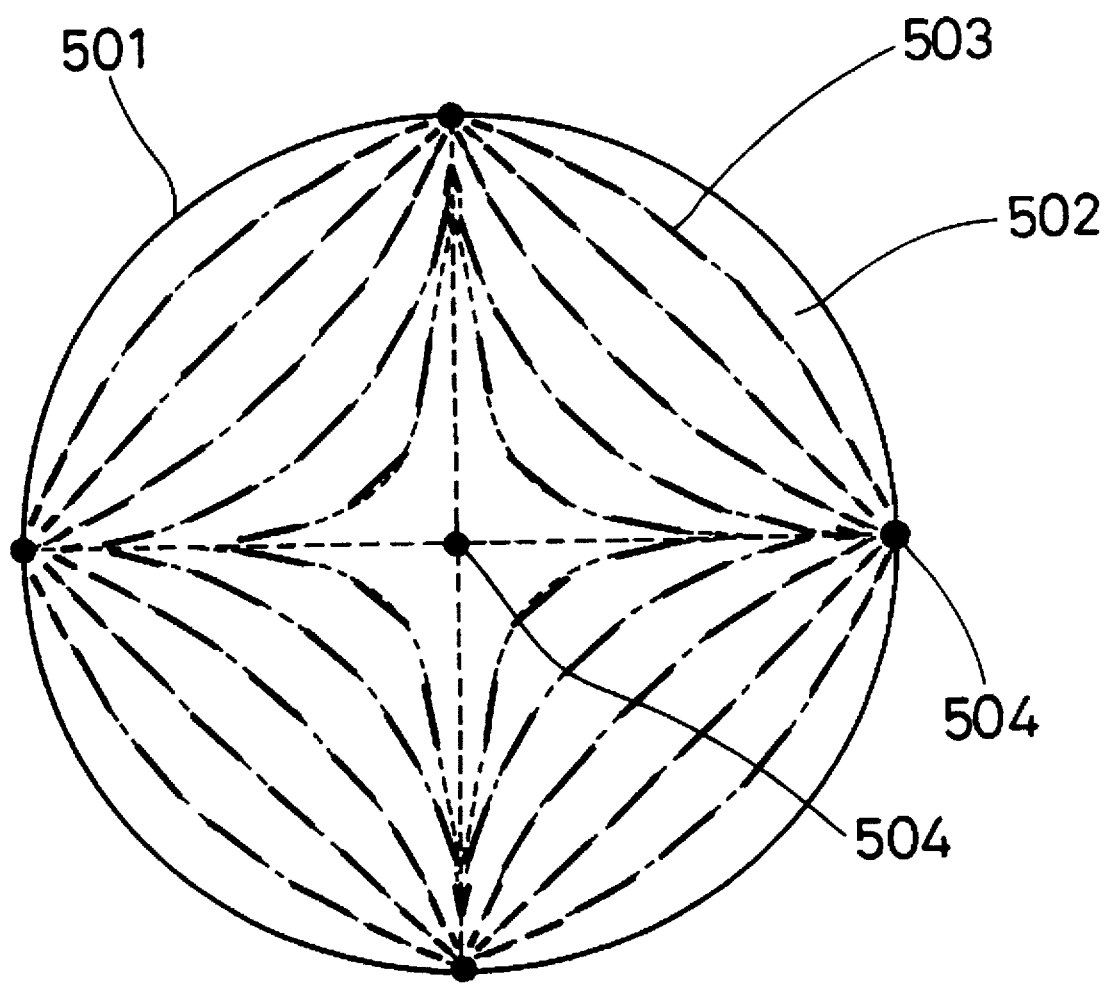
FIG. 5 is a perspective view showing orientation of liquid crystalline molecules on the mid-plane of a unit liquid crystalline cell having a plurality of particular points of still a further embodiment of the invention.
Figure 6:
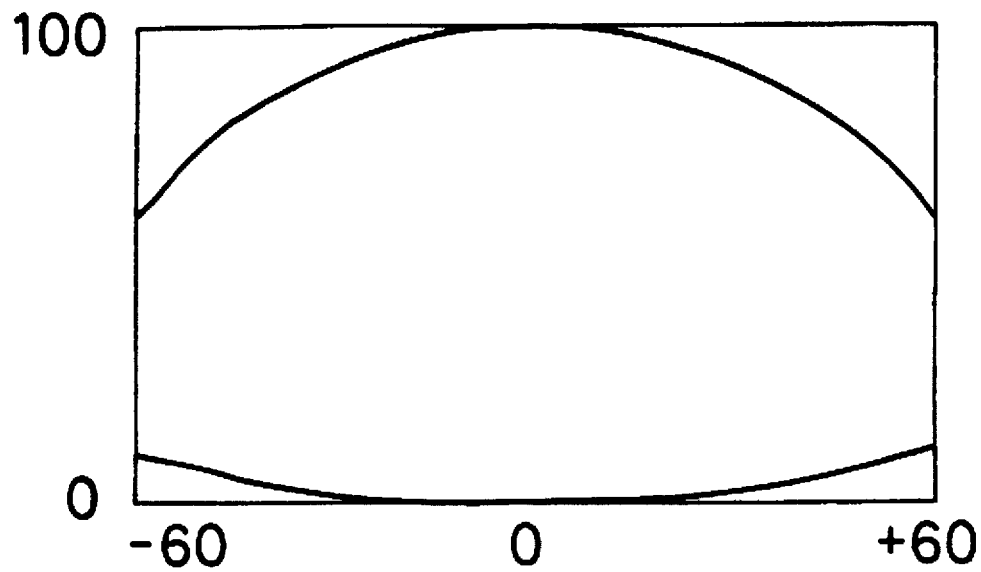
FIG. 6(a) and 6(b) show panel brightness—angle characteristics of a liquid crystal display panel in the vertical or horizontal direction of an embodiment of the invention.
Figure 6:
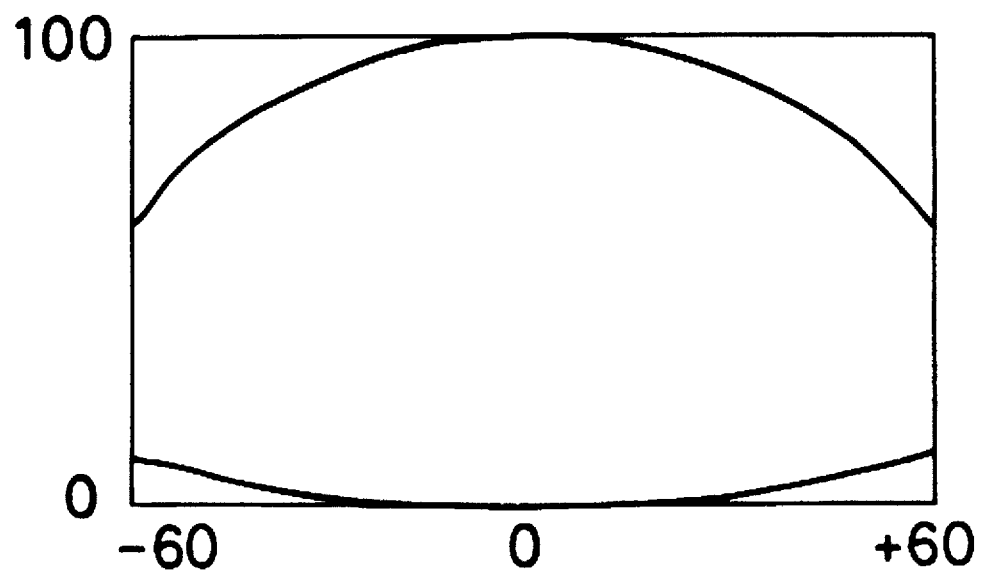

FIG. 5 is a view, taken from the panel's front side, showing the orientation of liquid crystalline molecules on the mid-plane of the unit liquid crystal cell when there are more than one orientation defects or particular points. 501 is polymer wall. 502 is a mid-plane. 503 is liquid crystalline molecule. 504 are peculiarity points.

FIG. 2–FIG. 4(c) show cases where liquid crystalline molecules are oriented substantially radially, vortex-like or concentrically with a particular point as the center but even in a specific orientation of liquid crystalline molecules as shown in FIG. 5 widening of viewing angle is possible for, with the mid-plane as a whole, the inclination directions for liquid crystalline molecules are roughly uniformized.

Further, in orientation of liquid crystalline molecules other than those shown in FIG. 2–FIG. 5 the viewing angle can be compensated with a single liquid crystal cell if the direction of the liquid crystalline molecules located on the mid-plane of the unit liquid crystal cell is substantially uniform as the unit liquid crystal cell as a whole.

Now, the significance of the position of the polarizer will be explained with reference to the figures.

When polarizing plates intersect at approx. 90°, the viewing angle characteristics are worse at ½ the intersection angle ($\Phi$=45°, 135°, 225°, 315°). That is, photo-leakage is increased, and contrast is deteriorated. This is because when two polarizing plates are intersected at 90°, the apparent intersection angle is larger when viewed from a diagonal point, which results in an increased photo-leakage.

Figure 8:
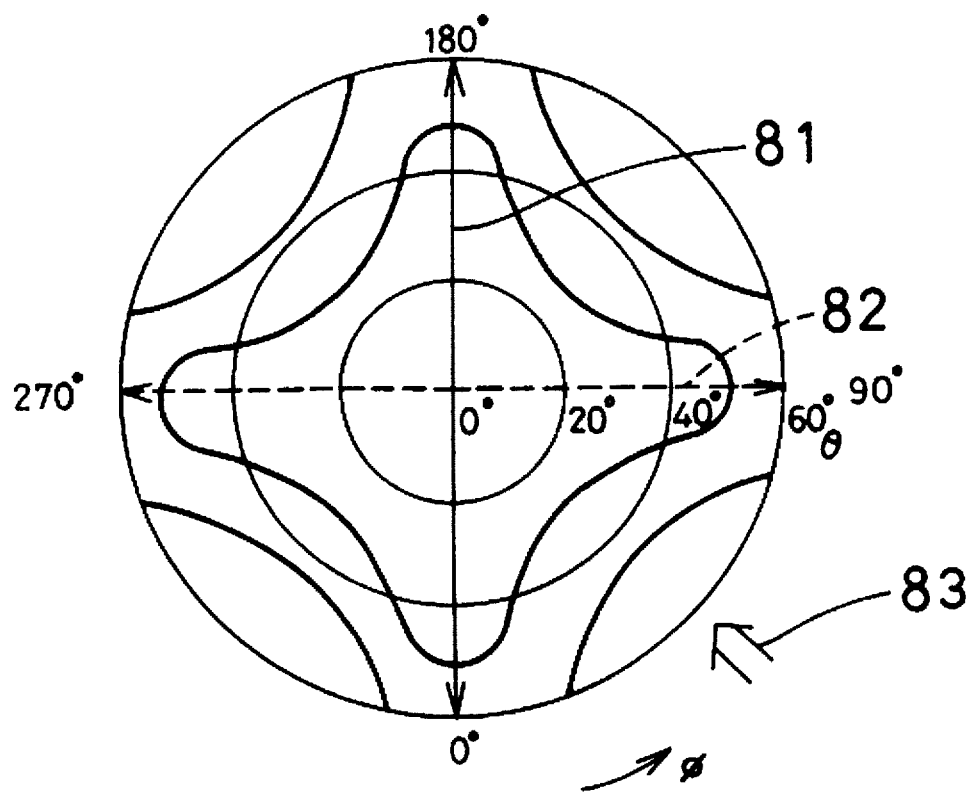
FIG. 8 shows the viewing angle characteristics of a polarizing plate at the Cross-Nicol-State.

In FIG. 8 reference numeral 81 represents the polarizing axis of the upper polarizing plate, reference numeral 82 represents the polarizer of the lower polarizing plate, and the thick curve is an equi-contrast curve and the contrast gets sharper as the curve is closer to the center. 83 shows a viewing angle direction.

In case of a twisted nematic liquid crystal panel treated for ordinary mono-axis orientation, the liquid crystalline molecules on the mid-plane (mid-plane molecules hereinafter) are positioned at ½ of the twisted angle (45° when the twisted angle is 90°). The twisting angle is required to be 90° for the inclination angle of the mid-plane molecules to agree with the viewing angle. When the polarizing plate is at the Cross-Nicol State and used as photo-waveguide, the polarizing axis or the absorbing axis for the incident ray is required to agree with axis of molecules on the substrate so that birefringence does not take place in the liquid crystal layer. Hence, when the portion that is narrow in visual angle of the intersected polarizing plates is bound to agree with the viewing angle in case of a nematic liquid crystal panel with a twisting angle of 90° (See FIG. 8). In case of a random-oriented liquid crystal panel as shown in FIG. 7, however, it is not necessary to have the incident polarizing angle agree (with axis of molecules) with a random-oriented liquid crystal panel as shown in FIG. 7 for matching with the best possible viewing angle of the intersected polarizing plates.

EXAMPLE 1

Hereinafter a liquid crystal panel as a preferred example of the invention will be described with reference to the figures.

On either glass substrate with transparent electrodes formed thereon an orientation film for horizontal orientation (Japan Synthetic Rubber Co., Ltd.'s polyimide orientation film Optomer AL-2061) was coated in print-mode, this followed by curing in a clean oven for 30 min. at 190° C.

Seals were prepared by screen-printing an epoxy-type adhesive on this substrate and subsequent uniform spraying of Sekisui Fine Chemical Co., Ltd.'s Micropearl (average particle size 5 μm). An orienting treatment such as rubbing was not conducted with the orientation film.

Figure 9:
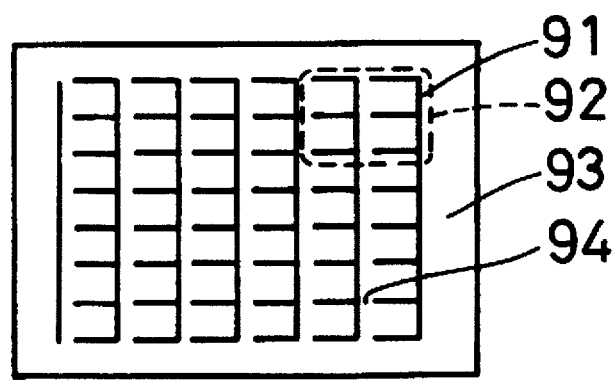
FIG. 9 shows the stepped construction of Example 1 of the invention.

The other substrate with transparent electrodes formed thereon was coated with negative-type photo-resist ONNR-20 (Tokyo Oukasha, Ltd.) by the use of a spinner for preparing steps, this followed by pre-baking, and a check-shaped stepping with a difference in level of 2.5 μm. The size of a stepped check was just ¼ of a picture element. In FIG. 9 reference numeral 92 represents one picture element, 91 a check-shaped stepping, 93 a substrate and 94 a slit for ease of injecting liquid crystal. With a slit-less closed loop structure it was difficult to inject liquid crystal. The orientation film was likewise formed on the stepped substrate thus prepared.

After sticking together both substrates a blank cell was prepared by heat hardening for one hour at 150° C. under uniform pressing at approx. 1 kg/cm².

For injection into this blank cell a liquid crystalline material with addition of Meruec A.G.'s "Kairal" S811 was first prepared for a pitch of 20 μm. The twist angle was then arranged to be 90° and this liquid crystal material was injected into the aforementioned black cell by the vacuum injection method. After completion of injection the injection hole was sealed with an epoxy-based sealant.

The liquid crystal panel thus prepared had good viewing angle characteristics, and there was no indication of angle-induced inversion.

Although discrimination occurred in this panel under application of voltage at a half-tone level, it ceased at the stepped portion, hence it was hardly significant.

In a comparative embodiment, an experiment was conducted with a stepless panel but in this case discrimination grew markedly until domain was visible, and there was an optical roughness at a halftone level.

The difference in height of the step is preferred to be less than cell's thickness but more preferably more than 1 μm.

EXAMPLE 2

Now a composite liquid crystal panel made up of a polymer or polymer gel and liquid crystal of an embodiment of the invention will be described.

A blank panel with orientation film formed thereon was prepared in the same way as Example 1 except that no the step was formed.

A chiral nematic liquid crystal of the same pitch as in Example 1 was prepared, 5 wt. % of UV-hardening type of monomer (Nippon Yuki Kagaku's 2-ethyl Huxley acrylate) was added, and the mixture was injected in the same way as in Example 1. It was followed by exposure to UV-ray 200 mW/cm² for 1 min. for polymerizing and hardening the monomer.

The liquid crystal panel thus prepared was wide in viewing angle, discrimination showed no growth beyond the polymer part even in a case of half tone display by application of voltage and thus was a good display article.

When a multi-functional monomer (Nippon Kayaku's Kayarad R-604) was used, a liquid crystal panel was prepared in the same way as described above followed by UV-irradiation for hardening, polymerization and gelation.

The result was good in viewing angle characteristics and good half tone display was observed.

EXAMPLE 3

The liquid display panel prepared in Example 1 as a comparative embodiment has attached thereto polarizing plates (Nitto Denko's NPF-G1229DU) in Crosnicol arrangement.

For that, polarizing plates were intersected so that, as shown in FIG. 10, the polarizing axis 1010 of either plate agrees with the viewing angle direction 1030. The angle dependency is also shown in FIG. 10. This may be called polarizing plate's viewing angle characteristics, and the best viewing angle dependency is seen along the polarizing axis (viewing angle direction). In FIG. 10 reference numeral 1020 represents the polarizing axis of the other polarizing plate.

Figure 11:
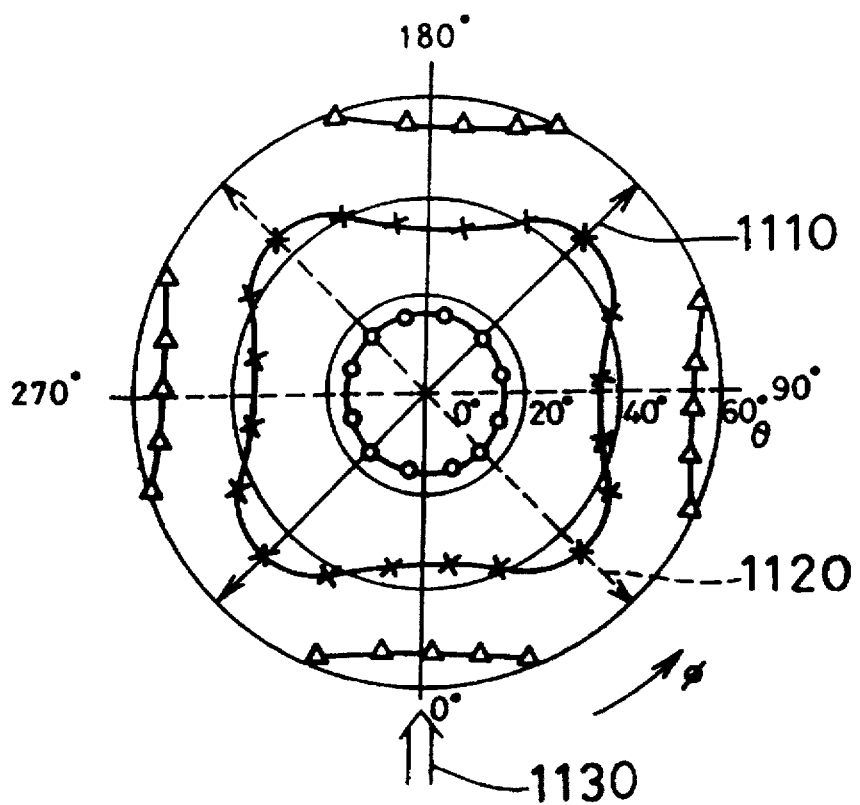
FIG. 11 is still a further sketch showing the viewing angle characteristics of a random-oriented liquid crystal display panel when the viewing angle (direction) in a comparative embodiment of the invention is matched with the center of the polarizing plate (45°).

As is the case with ordinary 90° twist nematic liquid crystal panel taken in a comparative embodiment, FIG. 11 shows viewing angle dependency characteristics when ½ of the intersection angle agrees with the viewing angle 1130. (In FIG. 11 reference numerals 1110, 1120 show polarizing axes respectively.) A comparison of FIG. 10 and FIG. 11 shows a marked widening of viewing angle along the viewing angle direction. Here the viewing angle direction is $\Phi=0°$.

Such effect was attainable with the stepped liquid crystal panel of Example 1 and with the composite panel of Example 2. In both FIG. 10 and FIG. 11, 0 in equi-contrast curve shows a contrast of not less than 100, x that of not less than 50 and Δ that of not less than 20 respectively.

EXAMPLE 4

With reference to FIG. 1, a pair of transparent glass substrates 101, 102 having thereon transparent electrodes 103, 104 made of indium-tin oxide film were stuck together with plastic spacers 106 (Micropearl: Sekisui Fine Co., Ltd.) 5 μm in diameter in between by the use of Sealant 105 ("Structbond": Mitsui Toatsu Chemicals Inc.) with a liquid crystal pouring inlet provided and a blank cell was obtained allowing the Sealant 105 to cure completely by heating 4 hours at 150° C.

Then, 8.20 g of fluorine-type nematic liquid crystal ZLI-4792 (Meruec AG.) with a refractive index anisotropy of 0.09 and 1.80 g of UV polymerizing material PN393 (Meruec AG.) were used as liquid crystal materials (ratio of the liquid materials to polymer-liquid crystal mixture is 82 wt. %), and these materials were thoroughly mixed at 40 x and a uniform mixed solution of polymer-liquid crystal was obtained.

This uniform mixed solution was poured into the aforementioned blank cell, pre-warmed as it was placed on a 40° hot plate, through the liquid crystal inlet, and after sealing the inlet it was exposed to UV-ray of 30 mW/cm² for 180 seconds at 40°, and a liquid crystal display panel surrounded by polymer walls was thus obtained.

When this liquid crystal display panel was observed by a polarization microscope in a Cross-Nicol State, formation of substantially round liquid crystal domains (unit crystal cells) 10–30 μm in diameter was confirmed. It was also confirmed that one orientation flaw was present near the center of each liquid crystal domain and with this as a center there were 4 black belts formed radially. When the liquid crystal panel was fixed the polarizer and an analyzer were rotated, the 4 black belts rotated in the same direction as the polarizer at the same angle. Although each liquid crystal domain is perfectly partitioned by polymer walls 110 not more than 2 µm thick, the polymer walls themselves were seen as black frames for they do not allow transmission of light.

When 30 Hz square waves varied in voltage were applied to this panel and the liquid crystal domains were observed, discrimination lines began forming rings on the liquid domain side as the voltage was raised to about 1.5 V but when the voltage was further raised, the ring diameter gradually decreased to zero at about 4 V.

Next, polarizing plates 107, 108 were stuck to the outside of this liquid crystal panel to have their polarizing axes crossed at 90°, the panel was then placed on a light box for photography and 30 Hz square waves varied in voltage, 0–16 V, were applied and the lighting condition of the liquid crystal panel was observed. The liquid crystal panel started lighting at about 1 V and a nearly perfect black display was attained at 5 V. This panel was observed from various directions with 30 Hz square waves of 5 V being applied but good black display was invariably visible with no optical roughness.

FIG. 5 is a diagram showing panel relative brilliancy—angle characteristic curves of a liquid crystal panel when 30 Hz, 0 V and 5 V have been applied thereto. The panel's brightness was measured by a luminance meter BM-7 0.2° in field of view (Topcon Co., Ltd.). In FIG. 5 the relative brightness in the ordinate is figure calculated with the panel brightness with no application of voltage to the front thereof as 100%. If the ratio of the panel brightness with no voltage applied thereto to the panel brightness when 30 Hz, 5 V square wave applied to the panel is defined as the contrast ratio, the contrast ratio on the front side of the panel=(panel brightness when no voltage is applied thereto)/(panel brightness when 30 Hz, 5 V square wave is applied thereto) is not less than 50. When we studied the angle range in which the contrast ratio=no less tan 5, the answer was no less than ±70° with regard to vertical and horizontal directions. When the panel brightness—voltage characteristics was measured from various observation directions, the panel brightness decreased invariably when voltage was applied thereto. This means that the panel we selected had excellent display characteristics as full color display means free from contrast inversion.

Then, this liquid crystal panel was kept in a thermostat at 40°, when alternate pulse of square waves 60 fs wide and 5 V was applied at intervals of 33 ms and the attenuation of voltage was determined by integration against time, the resulting voltage retaining rate was approx.

EXAMPLE 5

Fluorine-type nematic liquid crystal ZL-4792 (Meruec AG.) 0.09 in refractive index anisotropy and UV polymer material PN393 (Meruec AG.) were prepared to have the ratio of the liquid crystal material to the polymer liquid crystal mixture allowed to vary in a range of 70–95 wt. % and after thorough stirring and preparation of uniform mixed solution a liquid crystal panel was prepared in the same way as in Example 1.

The polarization plates were stuck to the outside of this liquid crystal panel with the polarized axes intersecting at 90° and the panel's brightness was observed when the panel was out of any electric field and square waves 30 Hz and 5 V were applied thereto. The result showed that with a panel, in which the ratio of liquid crystal material to polymer-liquid crystal mixture was less than 80 wt. %, the panel brightness in the absence of electric field was lower than given in Example 1 and when the panel was subjected to square waves 30 Hz and 5 V, the panel brightness was higher than in Example 1 and the black display was inperfect. Then, when a liquid crystal display panel, in which the ratio of liquid crystal material to polymer-liquid crystal mixture was 75 wt. %, was observed by microscope in a direct-crossing Nicol state, it was found that in this panel in the absence of any electric influence the diameter of the liquid crystal domain was smaller then the cell's thickness of 5 µm and its shape was spherical and scattering of light due to the difference in refractive index in the interface of liquid crystal and polymer. When it was subjected to square waves 30 Hz and 5 V, the panel's brightness increased due to light scattering-induced light leakage. Hence in the liquid crystal panel of the invention the mean diameter of the unit liquid crystal cells is preferred to be more than the width of cells with no risk of light scattering.

EXAMPLE 6

Fluorine-type nematic liquid crystal ZL-4792 (Meruec AG.) 0.09 in refractive index anisotropy in which chiral material CN (Chisso Sekiyu Kagaku, Ltd.) with its concentration adjusted against cell gap "d" so that its spontaneous twisted pitch P is d/p=0.05–0.5 and UV polymer material PN393 (Meruec AG.) were prepared to have the ratio of the liquid crystal material to the polymer liquid crystal mixture allowed to vary in a range of 70–95 wt. % and after thorough stirring and preparation of uniform mixed solution a liquid crystal panel was prepared in the same way as in Example 1.

The polarization plates were stuck to the outside of this liquid crystal panel with the polarized axes intersecting at 90° C. and the panel's brightness was observed when the panel was out of any electric field and square waves 30 Hz and 5 V were applied thereto.

The result showed that with panels whose d/P is smaller than 0.25 and larger than 0.25 the panel's transmission factor or brightness was lower than when d/P=0.25, and when their d/P was larger than 0.25 the panel was not only dark but also strongly yellowish green, the display quality being thus not favorable. With panels whose d/P was approx. 0.25 the panel was bright and also excellent in shade.

Examples of the liquid crystal display panel of this invention have been described above but for formation of substantially round unit liquid crystal cell surrounded by polymer wall it is not absolutely necessary to use an optical phase-separation method and similar results are obtainable when the polymer wall is formed by e.g. photolithograph. The polymer wall is for separating the liquid crystal orientation, hence it is not necessary to connect the substrates and it suffices if it is connected only in the vicinity of the substrates.

The invention may be embodied in other specific forms without departing from the spirit or essential characteristics thereof.

The above embodiments are to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A liquid crystal display panel comprising a liquid crystal layer between a pair of transparent electrode substrates and at least one polarizing plate disposed outside said transparent electrode substrates; wherein said liquid crystal layer has unit liquid crystal cells partitioned by steps each having a height lower than the thickness of said cells;

liquid crystal molecules in each of said liquid crystal cells are oriented parallel to surfaces of said substrates when an electric field is not applied; and said liquid crystal layer has domains in which said liquid crystal molecules are oriented at random.

2. The liquid crystal display of claim 1, wherein each of said unit liquid crystal cells is made of at least one composite selected from the group consisting of a composite of polymer and liquid crystal and a composite of polymer gel and liquid crystal.

3. The liquid crystal display panel according to claim 2, wherein said unit liquid crystal cells in the vicinity of said electrode substrates are surrounded by polymer walls and are substantially minute circular;

said liquid crystal molecules on a plane substantially in the center in thickness of the liquid crystal cells and parallel to the surface of said electrode substrate are uniformly oriented at random directions;

said liquid crystal molecules in the vicinity of the boundary between said liquid crystal layer and said electrode substrates are oriented parallel to the surface of said electrode substrate; and said liquid crystal molecules are nematic having a positive permittivity anisotropy.

4. The liquid crystal display panel according to claim 3, wherein one orientation flaw is present in the central portion of said unit liquid crystal cell.

5. The liquid crystal display panel according to claim 2, wherein said liquid crystal layer has a twist angle of substantially 90°.

6. The liquid crystal display panel according to claim 1 or 2, wherein said domains are formed at random directions without any orientation treatment.

7. The liquid crystal display panel according to claim 1 or 2, wherein said unit liquid crystal cells have a mean diameter of no less than the thickness of the liquid crystal layer and no more than picture element pitch.

8. The liquid crystal display panel according to claim 1, wherein two polarizing plates are present and said polarizing plates have an intersection angle of about 90°.

9. The liquid crystal display panel according to claim 1 or 2, wherein a ratio of a spontaneous pitch P of the liquid crystal material to a thickness d of the liquid crystal layer (d/P ratio) is about 0.25.

10. The liquid crystal display panel according to claim 1, wherein said unit liquid crystal cells surrounded by steps are smaller than one picture element.

11. The liquid crystal display panel according to claim 1, wherein said steps have a height not less than 1 μm.

12. The liquid crystal display panel according to claim 1, wherein said liquid crystal panel comprises domains in which liquid crystal molecules are oriented at random directions; at least two polarizing plates which are disposed in a manner to intersect the polarizing axis of the plates and at least one polarizing axis agrees with the viewing angle direction.

* * * * *